United States Patent
DiFoggio

(10) Patent No.: US 11,194,074 B2
(45) Date of Patent: Dec. 7, 2021

(54) SYSTEMS AND METHODS FOR DOWNHOLE IMAGING THROUGH A SCATTERING MEDIUM

(71) Applicant: Baker Hughes Oilfield Operations LLC, Houston, TX (US)

(72) Inventor: Rocco DiFoggio, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/557,018

(22) Filed: Aug. 30, 2019

(65) Prior Publication Data
US 2021/0063601 A1    Mar. 4, 2021

(51) Int. Cl.
*G01V 8/02* (2006.01)
*G06K 9/62* (2006.01)
*H04N 5/225* (2006.01)
*G06K 9/20* (2006.01)

(52) U.S. Cl.
CPC ............ *G01V 8/02* (2013.01); *G06K 9/2036* (2013.01); *G06K 9/6256* (2013.01); *H04N 5/2253* (2013.01); *H04N 2005/2255* (2013.01)

(58) Field of Classification Search
None
See application file for complete search history.

(56) References Cited

U.S. PATENT DOCUMENTS

| 2,313,310 A | 3/1943 | Arnold |
| 2,334,475 A | 11/1943 | Claudet |
| 2,408,965 A | 10/1946 | Winn |
| 2,667,109 A | 1/1954 | Piety |
| 2,812,697 A | 11/1957 | Laval |
| 2,849,530 A | 8/1958 | Fleet |
| 2,953,979 A | 9/1960 | Rosene |
| 4,745,562 A | 5/1988 | Prazdny |
| 4,779,201 A | 10/1988 | Iizuka |
| 4,994,671 A | 2/1991 | Safinya |

(Continued)

FOREIGN PATENT DOCUMENTS

| GB | 2332331 | 6/1999 |
| RU | 2 091 058 | 9/1997 |
| WO | 2019/067552 | 4/2019 |

OTHER PUBLICATIONS

Larry Hardesty, "Algorithm Could Enable Visible-Light-based Imaging for Medical Devices, Autonomous Vehicles," MIT News Office, Oct. 3, 2016, 8 pages, https://www.ecnmag.com/article/2016/10/algorithm-could-enable-visible-light-based-imaging.

(Continued)

*Primary Examiner* — Edemio Navas, Jr.
(74) *Attorney, Agent, or Firm* — Hogan Lovells US LLP

(57) ABSTRACT

A system for downhole optical imaging includes a housing forming at least a portion of a tool string. The system also includes a source arranged within the housing, the source emitting light through a window formed in the housing. The system further includes an imager arranged within the housing, the imager receiving imaging data through the window. The system also includes a control system communicatively coupled to the imager, the control system processing the image data using one or more algorithms, the one or more algorithms modifying the imaging data based at least in part on a scattering material surrounding the housing.

20 Claims, 6 Drawing Sheets

(56) References Cited

U.S. PATENT DOCUMENTS

| | | | |
|---|---|---|---|
| 5,299,035 | A | 3/1994 | Leith |
| 5,418,797 | A | 5/1995 | Bashkansky |
| 5,517,024 | A | 5/1996 | Mullins |
| 5,625,458 | A | 4/1997 | Alfano |
| 5,644,429 | A | 7/1997 | Alfano |
| 5,663,559 | A * | 9/1997 | Auzerais ............. E21B 47/0002 250/269.1 |
| 5,790,185 | A | 8/1998 | Auzerais |
| 6,495,833 | B1 * | 12/2002 | Alfano ............... G01N 21/4795 250/330 |
| 7,095,012 | B2 | 8/2006 | Fujisawa |
| 7,315,372 | B1 * | 1/2008 | Billard ............... G01N 15/1434 356/338 |
| 7,322,416 | B2 | 1/2008 | Burris |
| 7,363,967 | B2 | 4/2008 | Burris |
| 7,601,950 | B2 | 10/2009 | Kischkat |
| 7,646,480 | B2 | 1/2010 | Vessereau |
| 7,751,038 | B2 | 7/2010 | Vessereau |
| 7,937,223 | B2 | 5/2011 | Ciglenec |
| 8,201,625 | B2 | 6/2012 | Almaguer |
| 8,307,900 | B2 | 11/2012 | Lynde |
| 8,554,087 | B2 | 10/2013 | Osterberg |
| 9,091,151 | B2 | 7/2015 | Jones |
| 9,103,176 | B2 | 8/2015 | Delmar |
| 9,110,166 | B2 | 8/2015 | Chang |
| 9,127,130 | B2 | 9/2015 | Krippner |
| 9,282,260 | B2 | 3/2016 | Respini |
| 9,334,727 | B2 | 5/2016 | Jones |
| 9,334,729 | B2 * | 5/2016 | Indo ....................... E21B 49/10 |
| 9,528,931 | B2 | 12/2016 | Freese |
| 9,552,958 | B2 | 1/2017 | Hooghan |
| 9,651,476 | B2 | 5/2017 | Speck |
| 9,765,609 | B2 | 9/2017 | Chemali |
| 10,060,242 | B2 | 8/2018 | Benoit |
| 10,065,187 | B2 | 9/2018 | Sieben |
| 10,126,220 | B2 | 11/2018 | Larson |
| 10,151,677 | B2 | 12/2018 | Kulkarni |
| 2003/0065268 | A1 | 4/2003 | Chen |
| 2003/0183752 | A1 | 10/2003 | Kobayashi |
| 2006/0146331 | A1 | 7/2006 | Granot |
| 2007/0035736 | A1 | 2/2007 | Vannuffelen |
| 2009/0086216 | A1 | 4/2009 | Marks |
| 2009/0147907 | A1 | 6/2009 | Wraight |
| 2009/0166035 | A1 | 7/2009 | Almaguer |
| 2010/0104149 | A1 | 4/2010 | Nielsen |
| 2011/0096622 | A1 | 4/2011 | Sinha |
| 2012/0013779 | A1 | 1/2012 | Hattery |
| 2012/0194649 | A1 | 8/2012 | Javidi |
| 2012/0312530 | A1 * | 12/2012 | Pope ........................ E21B 49/08 166/250.01 |
| 2013/0342665 | A1 | 12/2013 | Wang |
| 2014/0146157 | A1 | 5/2014 | Duplisea |
| 2014/0278111 | A1 * | 9/2014 | Gerrie .................. E21B 47/0002 702/8 |
| 2015/0036021 | A1 | 2/2015 | Gigan |
| 2016/0202678 | A1 * | 7/2016 | Aggarwal .............. H04N 5/332 700/275 |
| 2017/0010181 | A1 * | 1/2017 | Xia .......................... E21B 47/00 |
| 2019/0011360 | A1 | 1/2019 | Perkins |

OTHER PUBLICATIONS

Brown et al., "Imaging: Getting the Picture Downhole," Oilfield Review, Sep. 2015, vol. 27, No. 5, pp. 4-21.

Katz et al., "Non-invasive real-time imaging through scattering layers and around corners via speckle correlations," 2014, Nature Photonics, No. 8, vol. 784, 14 pages, https://arxiv.org/ftp/arxiv/papers/1403/1403.3316.pdf.

Satat et al., "Calibration Invariant Imaging Object Classification through Scattering Media with Deep Learning," 2017, Optics Express, vol. 25, Issue 15, p. 17466-17479, http://web.media.mit.edu/~guysatat/calib_inv.

Guy Satat, "Imaging Through Scattering," Jun. 2015, MIT, Thesis, 84 pages.

Horn et al., "Imaging in Highly Scattering Media," Oct. 30, 1995, 10 pages.

Prensky, "What's New in Well Logging and Formation Evaluation," Mar. 16, 2016, 13 pages, https://www.scmdaleel.com/article/what-rsquo-s-new-in-well-logging-and-formation-evaluation/319.

Atefah Shahinpour, "Borehole image log analysis for sedimentary environment and clay volume interpretation," Sep. 2013, Norwegian University of Science and Technology, p. 1-82.

International Search Report, corresponding to International Application No. PCT/US2020/048460 dated Oct. 8, 2020.

* cited by examiner

SYSTEMS AND METHODS FOR DOWNHOLE IMAGING THROUGH A SCATTERING MEDIUM

BACKGROUND

1. Field of Invention

This disclosure relates in general to oil and gas tools, and in particular, to systems and methods for downhole optical imaging applications through wellbore fluids that may include particulates or fluids.

2. Description of the Prior Art

In oil and gas production, various tools and techniques may be utilized in downhole imaging to provide information for determining one or more features of a wellbore. For example, different imaging techniques, such as acoustic, electromagnetic, nuclear, and the like, may be utilized to determine different properties, such as resistivity, permeability, and the like. Different downhole imaging techniques may provide a variety of advantages and disadvantages related to aspects such as cost, resolution, and time, among others. Additionally, the difficulty of deployment may vary among different techniques. For example, while optical imaging techniques have much better spatial resolution and image quality than non-optical techniques, it may be difficult to deploy optical techniques in a wellbore due to pressures, temperatures, and the overall environment. In various embodiments, the wellbore may be filled with fluids (e.g., gas, liquids, solids, or combinations thereof) which may attenuate or scatter the light and cause difficulties with downhole optical methods. The resolution of a typical acoustic or electrical borehole imaging tools is approximately 2.5 mm to 5 mm, whereas the resolution achieved by processing optical images obtained through scattering media can be around 34 microns, which is 75 to 150 times better.

Historically, downhole optical wellbore imaging has utilized one of three main techniques: 1) Press a transparent optical window (or optical fibers) against the borehole wall as a mud excluder to exclude the highly-scattering drilling mud; 2) Replace drilling mud with a transparent fluid over the section of wellbore wall that is to be optically imaged; and 3) Use infrared light to see through the dark asphaltenes of crude oil. Each of these techniques, however, has drawbacks and none of them provide the means to reconstruct an image taken through a light scattering medium, such as a borehole fluid containing suspended solid particles, gas bubbles, or liquid-in-liquid emulsions. For example, mud excluders may be difficult to secure against the borehole wall. For example, with wireline applications, additional anchors may be needed to push the window or fibers tightly against the wellbore for the most mud exclusion. Additionally, regarding transparent fluids, it may be difficult to position a slug of transparent fluid at the desired depth in the well and it also disrupts wellsite operations. Light is also highly attenuated by the scattering of suspended particles in a wellbore fluid such as drilling mud. Such scattering can easily reduce light intensity by a factor of 100,000 or more per millimeter of pathlength.

Previous techniques in literature have failed to overcome these problems. For example, U.S. Pat. No. 2,334,475 describes pressing a window against a wall of a well, in line with Technique 1 described above. Similarly, U.S. Pat. No. 2,812,697 describes use of localized substitution of fluids per Technique 2. G.B. Patent No. 2,332,331 describes infrared radiation to enable imaging through a crude oil's asphaltenes because asphaltene absorbance is reduced at longer wavelengths, however, such techniques are still subject to scattering by any suspended particles. U.S. Pat. No. 2,334,475, filed in 1938, describes optical imaging of the wellbore using a transparent mud excluder and using infrared to ultraviolet light. It states, "the incident beam and the light emitted by the walls are arranged to pass through a window of transparent material such as glass or quartz, for example, which, according to the invention, is pressed firmly against the wall of the well by appropriate means". U.S. Pat. No. 5,517,024 states that drilling "fluid is relatively opaque, even over short distances of the order of millimeters. Even when water or brine is used as the drilling fluid, the presence of cuttings and suspended solids and formation fluids render the fluid effectively opaque". The only mitigations that U.S. Pat. No. 5,517,024 offers are that the standoff distance be "less than one millimeter" or "nonexistent" or that one use a "light transmissive fluid such as water or brine" without any suspended particles. U.S. Pat. No. 7,646,480 for optical imaging of a borehole states that "video technology for inspecting the inside of boreholes is known" but that "such an approach requires the presence of a transparent fluid in the well and so cannot be used in the drilling or production phase of a well in which opaque fluids are present". The only mitigation offered by U.S. Pat. No. 7,646,480 is to use "a sensor head including a window for application against the wall of the borehole" so that "the sensor head is applied to the borehole wall". U.S. Patent Publication No. 2011/0096622 proposes acoustic imaging for optically opaque fluids and states that using a "regular optical camera . . . requires replacing the existing drilling fluid with clear water that takes several days". U.S. Pat. No. 9,765,609 states that "where the borehole fluid is too opaque, a clear fluid can be used to flush the region immediately in front of the sensors to enable imaging." There is no suggestion to perform downhole wellbore imaging with the help of an algorithm for obtaining an image through highly scattering media so, for 81 years, this has been a long unmet need in borehole imaging. Many other examples of these implementations are present in literature.

SUMMARY

Applicant recognized the problems noted above herein and conceived and developed embodiments of systems and methods, according to the present disclosure, for downhole optical imaging.

In an embodiment, a system for downhole optical imaging includes a housing forming at least a portion of a tool string. The system also includes a source arranged within the housing, the source emitting light through a window formed in the housing. The system further includes an imager arranged within the housing, the imager receiving imaging data through the window. The system also includes a control system communicatively coupled to the imager, the control system processing the image data using one or more algorithms, the one or more algorithms modifying the imaging data based at least in part on a scattering material surrounding the housing.

In an embodiment, a method for downhole optical imaging includes positioning an imaging device and a source within a downhole tool. The method also includes arranging the downhole tool proximate a wellbore wall in an underground formation. The method further includes collecting image data, the image data collected through a scattering material, such as drilling fluid, positioned between the downhole tool and the wellbore wall. The method also includes processing the image data, using one or more algorithms, the one or more algorithms adjusting the image data at least in part because of the scattering material.

In an embodiment, a system for downhole optical imaging includes a housing forming at least a portion of a tool string, the housing arranged within a wellbore, the wellbore including a fluid having suspended particles. The system also includes a source arranged within the housing, the source emitting light through a window formed in the housing. The system further includes an imager arranged within the housing, the imager receiving imaging data through the window, the imager arranged proximate the source. The system also includes a control system adapted to process the image data via one or more algorithms for determining imaging information through a scattering material, the one or more algorithms adapted for use with a downhole environment where the imaging information travels through the scattering material at least two times.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

Figure 1:
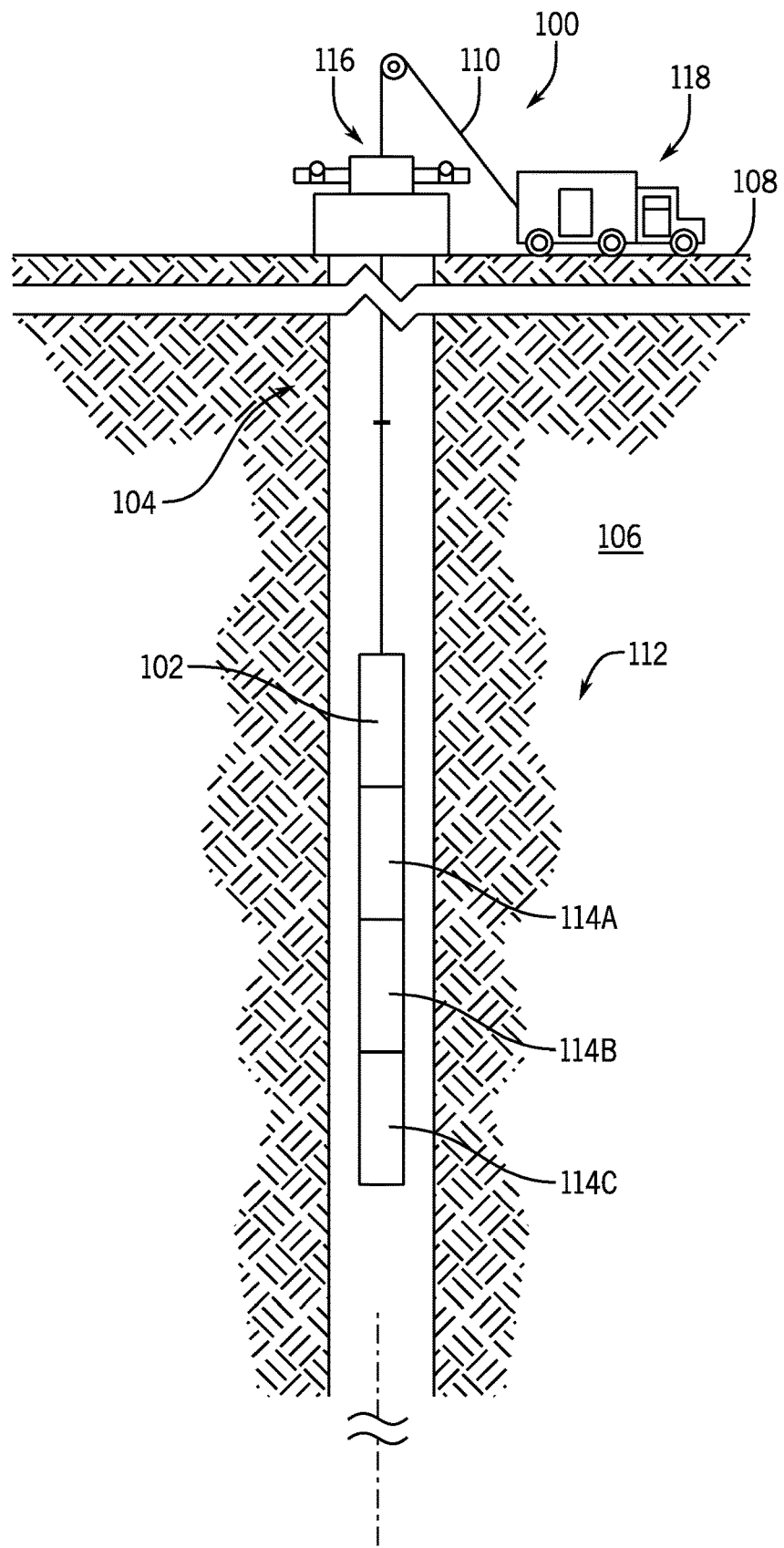
FIG. 1 is a schematic elevational view of an embodiment of a wellbore system, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure are directed toward systems and methods for downhole optical imaging to determine one or more properties of a borehole wall or formation. In various embodiments, the optical imaging may be performed in a borehole filled with a scattering medium, such as substantially opaque fluids that may include particulates. The scattering medium may negatively affect optical signals (e.g., light) through a variety of interactions, such as absorption, reflection, scattering, and the like. Embodiments of the present disclosure facilitate collection of imaging information even in the presence of the scattering medium. The image information may then be analyzed, for example using a time gated or speckle correlation algorithm. By way of example only, time gating may be utilized to evaluate certain types of photons, such as ballistic photons, or to evaluate data collection over a period of time in order to determine the image information based on the concept that photons that scatter less will arrive at their destination earlier. Ballistic photons are the ones that have not been scattered but have taken the straight line path, which is the shortest path, so they are the first to arrive. The next arrivals have undergone some scattering and so on. Combining data from all times frames reconstructs the original object being imaged. In the time gating approach, photons may be emitted by a laser within a short time burst where the time of the burst defines time zero. In another example, speckle correlation may evaluate a speckle pattern, and through correlation algorithms, reconstruct the original images. For example, as a light beam (e.g., photons) is diffusely reflected through a scattering material, a seemingly random granular pattern may be observed. Speckle correlation utilizes autocorrelation and phase-retrieval algorithms, which may include trained neural networks and the like, to correct and reconstruct the granular patterns into the original images.

In various embodiments of the present disclosure, the systems and methods may be deployed in a downhole environment, such as within a wellbore. As a result, components of the system may be particularly selected for use in high temperature and/or high pressure environments. Furthermore, in various embodiments, systems and methods may be utilized to reduce a quantity of scattering material or to reduce a distance between a source and/or imager and the borehole wall, such as an optical window extension or the like.

In various embodiments, the optical imaging data provides higher resolution images for later evaluation, enabling detection of fine fractures in unconventional reservoirs. It also enables a geologist to see and interpret fine geologic features that are below the resolution of acoustic or electrical imaging tools. Furthermore, the systems and methods of the instant application address two obstacles associated with imaging through a scattering fluid, such as drilling mud, due to 1) optical scattering by suspended solid particles (or by gas bubbles or by liquid-in-liquid emulsions) in the mud, and 2) optical absorption, especially in oil-based muds, by asphaltenes and resins that have been deliberately added or that have accidentally accumulated while drilling through various rock layers, which contain these compounds. To address these issues, embodiments of the present disclosure may include a pad device on a logging tool to reduce the thickness of mud between the imager and the borehole wall (e.g., approximately 2-3 mm, or less). Additionally, a source for embodiments of the present disclosure may be near-infrared light (e.g., integrating all light between 1300 nm and 2000 nm), which light is much less absorbed by asphaltenes and resins, although visible light can be used if there are few visible light absorbers, such as asphaltenes, in the wellbore fluid. Furthermore, algorithms developed for optical imaging may be deployed with embodiments of the present disclosure.

FIG. 1 is a schematic side view of an embodiment of a wellbore system 100 that includes a tool 102 (which may be part of a tool string) being lowered into a wellbore 104 formed in a formation 106 from a surface location 108. The illustrated wellbore 104 may be referred to as being open-bore, as no casing is illustrated along the wellbore walls. However, it should be appreciated that other wellbores, such as cased wellbores, may also utilize embodiments of the present disclosure. In a cased wellbore, casing may be installed along at least a portion of the wellbore walls and cemented in place, thereby forming a barrier along the wellbore walls. In embodiments, the casing may be perforated to facilitate recovery of fluids, such as hydrocarbons, from the wellbore. Furthermore, the wellbore 104 may be filled with a fluid in various embodiments, such as a drilling fluid, hydrocarbons, brine, combinations thereof, or the like. Moreover, it should be appreciated that other components may also be arranged within the wellbore 104 and the embodiment of FIG. 1 is for illustrative purposes only. For example, the wellbore 104 may also include plugs or remediation equipment. The illustrated wellbore system 100 may be referred to as a wireline system because the tool 102 is conveyed on a cable 110, such as an electric wireline although this system could also be deployed on a drill string for measurement while drilling. In various embodiments, the electric wireline may transmit electrical signals and/or energy from the surface location 108 into the wellbore 104, for example to provide operational power for the tool 102 and/or to transmit data, such as data obtained from sensors arranged on the tool 102. In various embodiments, the tool 102 may be utilized to perform downhole logging operations, and may be an imaging tool, a resistivity tool, a nuclear tool, or any other logging tool that may be used in a downhole environment. Moreover, in various embodiments, the tool 102 may include multiple logging or imaging tools therein. For simplicity, all logging or imaging tools described herein will be described with reference to the tool 102. However, in various embodiments the logs or images obtained from the various tools may be obtained at different times using different tools 102.

As described above, in various embodiments the tool 102 may be part of a tool string 112, which may include various components utilized for wellbore operations. For example, the tool string 112 may include various other tools 114A-114C that may include sensors, measurement devices, communication devices, and the like, which will not all be described for clarity. In various embodiments, the tool string 112 may include one or more tools to enable at least one of a logging operation, a perforating operation, or a well intervention. For example, nuclear logging tools, acoustic imaging tools, optical imaging tools, fluid sampling tools, core sampling devices, and the like may be utilized in logging operations. Correlations between the high-resolution optical images of the disclosed embodiments taken in one well with corresponding lower-resolution acoustic or electrical images other logging data taken in the same well may be used for interpreting historical acoustic or electrical images or other logging data taken in neighboring wells across the same geological formations where optical images have not yet been taken. Perforating operations may include ballistic devices being lowered into the wellbore to perforate casing or the formation. Furthermore, well interventions may include operations related to analyzing one or more features of the wellbore and proceeding with performing one or more tasks in response to those features, such as a data acquisition process, a cutting process, a cleaning process, a plugging process, and inspection process, and the like. Accordingly, in various embodiments, the tool string 112 may refer to tools that are lowered into the wellbore. Additionally, passive devices such as centralizers or stabilizers, tractors to facilitate movement of the tool string 112 and the like may also be incorporated into the tool string 112.

In various embodiments, different power and/or data conducting tools may be utilized by embodiments of the present disclosure in order to send and receive signals and/or electrical power. As will be described below, in various embodiments sensors may be incorporated into various components of the tool string 112 and may communicate with the surface or other tool string components, for example via communication through the cable 110, mud pulse telemetry, wireless communications, wired drill pipe, and the like. Furthermore, it should be appreciated that while various embodiments include a wireline system, in other embodiments rigid drill pipe, coiled tubing, or any other downhole exploration and production methods may be utilized with embodiments of the present disclosure.

The wellbore system 100 includes a wellhead assembly 116 shown at an opening of the wellbore 104 to provide pressure control of the wellbore and allow for passage of equipment into the wellbore 104, such as the cable 110 and the tool string 112. In various embodiments, the wellhead assembly 116 may include a blowout preventer (BOP). In this example, the cable 110 is a wireline being spooled from a service truck 118. The illustrated cable 110 extends down to the end of the tool string 112. In operation, the cable 110 may be provided with slack as the tool string 112 is lowered into the wellbore 104, for example to a predetermined depth. In various embodiments, a fluid may be delivered into the wellbore 104 to drive movement of the tool string 112, for example where gravity may not be sufficient, such as in a deviated wellbore. For example, a fluid pumping system (not illustrated) at the surface may pump a fluid from a source into the wellbore 104 via a supply line or conduit. To control the rate of travel of the downhole assembly, tension on the wireline 110 is controlled at a winch on the surface, which may be part of the service tuck 118. Thus, the combination of the fluid flow rate and the tension on the wireline may contribute to the travel rate or rate of penetration of the tool string 112 into the wellbore 104. The cable 110 may be an armored cable that includes conductors for supplying electrical energy (power) to downhole devices and communication links for providing two-way communication between the downhole tool and surface devices. Moreover, in various embodiments, tools such as tractors and the like may further be disposed along the tool string 112 to facilitate movement of the tool string 112 into the wellbore 104. Thereafter, in various embodiments, the tool string 112 may be retrieved from the wellbore 14 by reeling the cable 110 upwards via the service truck 118. In this manner, logging operations may be performed as the tool string 112 is brought to the surface 108.

In operation, various logging techniques may be utilized in order to obtain one or more formation properties to provide operators with information for hydrocarbon recovery. For example, detection of fine fissures along the wellbore wall may indicate that hydraulic fracturing operations may be useful for generating flow paths along these fissures. However, many logging techniques provide low resolution images, which may be difficult to analyze and detect the one or more formation features, such as fine fissures but which optical imaging can detect. Accordingly, embodiments of the present disclosure may deploy an optical imaging technique that utilizes one or more algorithms to facilitate optical imaging through a scattering material, such as fluid present within the wellbore. Optical imaging may also be useful after fracturing the formation and after using proppant to see the effectiveness of the fracturing and effectiveness of the proppant in holding open the fractures. The optical imaging technique may include equipment that is particularly selected for use with the high temperature and high pressure wellbore environment. Furthermore, the optical imaging technique may overcome the deficiencies of the prior art by imaging through the scattering material, using a light source that may have reduced absorption in the presence of hydrocarbons, and integrating machine learning techniques for evaluation and analysis.

Figure 2:
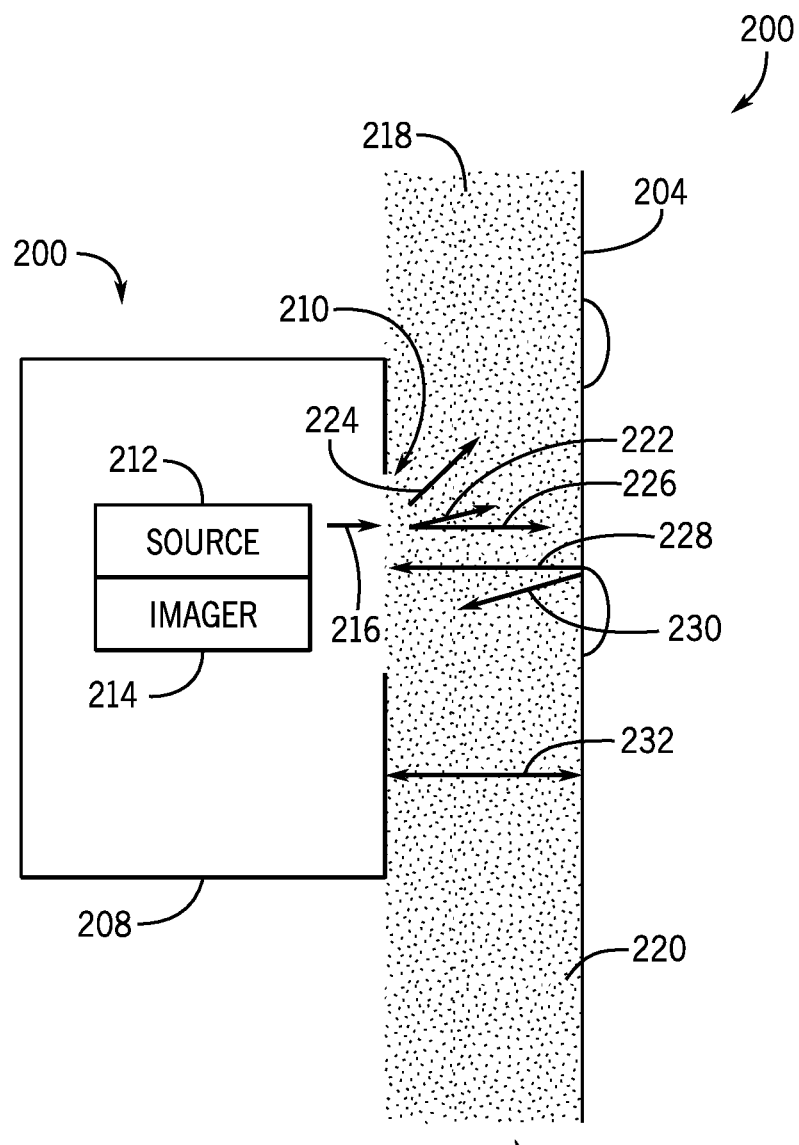
FIG. 2 is a schematic cross sectional view of an embodiment of a downhole tool arranged within a wellbore, in accordance with embodiments of the present disclosure.

FIG. 2 is a schematic cross-sectional view of an embodiment of a downhole environment 200 including an imaging tool 202 interrogating a wellbore wall 204 of a wellbore 206. In various embodiments, the imaging tool 202 may form at least a portion of the tool string 112 and is transported into the wellbore 206 via the cable 110 in wireline operations. It should be appreciated that the downhole environment 200 may be subject to high temperature and high pressures, and as a result, components of the imaging tool 202, such as a housing 208, window 210, and the like may be particularly selected to accommodate the environment. In various embodiments, the window 210 includes a transparent or semi-transparent material to facilitate interrogation of the wellbore wall 204 via a source 212 and also the receipt of imaging information via an imager 214. In various embodiments, the source 212 includes a light source that emits near infrared light, such as light having a wavelength of approximately 1300 nm and 2000 nm. The source 212 may emit a beam 216 that travels through the window 210 and into a scattering material 218 that is positioned within the wellbore 206. In various embodiments, the scattering material 218 may be fluid within the wellbore annulus and may include solids, liquids, gases, or combinations thereof. For example, in the illustrated embodiment, the scattering material 218 includes suspended particulates 220. In various embodiments, the scattering material 218 may also include fluids having a variety of different compositions, such as hydrocarbons, water, brines, and the like.

The illustrated beam 216 enters the scattering material 218 and may deflect due to interaction with components of the scattering material 218. For example, a first deflected beam 222 and a second deflected beam 224 provide illustrated potential interactions due to the scattering material 218. As a result, imaging information (e.g., data acquired due to the interrogation of the wellbore wall 204) may be blurred or otherwise noisy in response to the deflected beams. In certain embodiments, however, the beam 216 may include a straight path beam 226, which may include photons within the beam 216 that reach the wellbore wall 204 without interaction (or with minimal interaction) within the scattering material 218. In various embodiments, these may be referred to as ballistic photons. As will be described below, in time gated data collection the ballistic photons may be the first to reach the wellbore wall 204, and as a result, data collected within a certain period of time may have a high correlation to ballistic photons. The beam 216 may reflect off the wellbore wall 204 and return to the imager 214. In various embodiments, the imager 214 is a charged coupled device image sensor, a complementary metal-oxide semiconductor image sensor, or the like. The imager 214 receives the reflected beam and, as a result, image information may be acquired with respect to the wellbore wall 204. As noted above, different types of reactions within the scattering material 218 may affect the type of information received. For example, a reflected straight path beam 228 may not experience interaction (or limited interaction) with the scattering material 218 while a third deflected beam 230 may interact with the scattering material 218.

In the illustrated embodiment, a scattering distance 232 is representative of a radial distance from the window 210 to the wellbore wall 204. The scattering distance 232 may be considered the distance traveled by the beam 216, or components thereof, to interact with the wellbore wall 204. However, because the source 212 and imager 214 are arranged proximate one another in the illustrated embodiment, the total distance traversed by the beam 216 and its reflected information is equal to twice the scattering distance 232. Accordingly, it should be appreciated that a number of straight path beam 226 photons and reflected straight path beam 228 photons may be low, due to the high number of potential scattering interactions. As a result, different periods of time, numbers of sources, or the like may be utilized in order to provide sufficient information for capture and analysis.

In operation, a signal may be transmitted to the source 212, for example from a local or remote controller, to interrogate the wellbore wall 204 with the beam 216. In various embodiments, the source 212 may emit a timed beam, which may correspond with a time gated approach described below. Moreover, as noted above, there may be multiple sources 212 which may operate together or independently. The imager 214 may receive the image information, which may have an associated time stamp or other designating information. Thereafter, the image information may be processed in order to develop images corresponding to the wellbore wall 204. For example, as will be described below, ballistic photons may be evaluated in order to identify one or more features of the wellbore wall. Additionally, various algorithms may be utilized to reconstruct image information of the wellbore wall from speckle information. Accordingly, high resolution information may be acquired utilizing downhole optical imaging techniques where scattering material is present within the wellbore and along a path of the optical source.

Figure 3D:
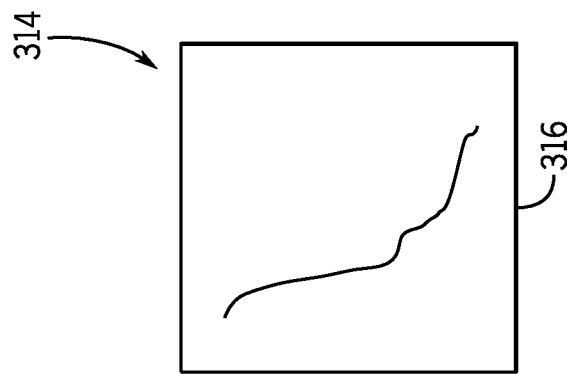
FIGS. 3A-3D are examples of image data for use with downhole optical imaging, in accordance with embodiments of the present disclosure.
Figure 3C:
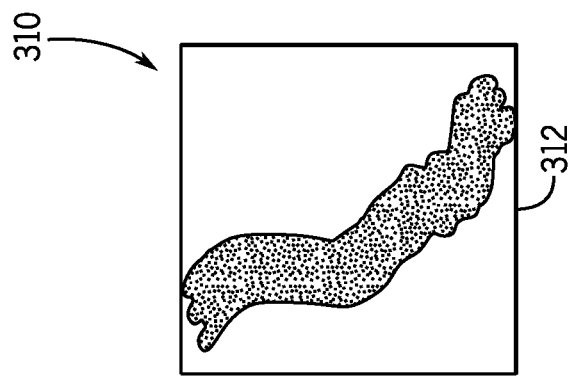
Figure 3B:
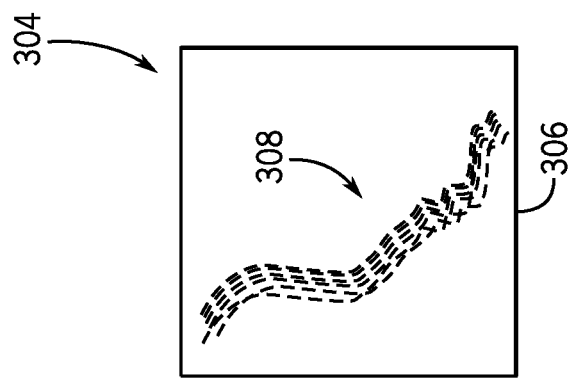
Figure 3A:
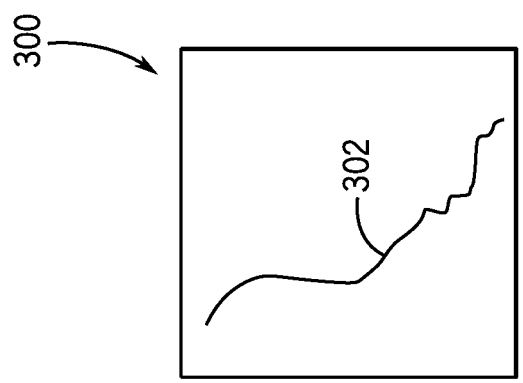

FIGS. 3A-3D are example borehole wall images that may be analyzed using systems and methods of the present disclosure. As described above, in various embodiments the source 212 may emit the beam 216 toward the wellbore wall 204 and image information may be recorded by the imager 214. In the illustrated embodiments FIG. 3A is an example 300 of the wellbore wall 204. As shown, the wall 204 includes a fissure 302 extending along a portion of the wall 204. Identification of fissures may be useful for wellbore operations because fissures may indicate potential areas for well stimulation techniques, such as hydraulic fracturing.

Accordingly, image information related to an appearance of the wellbore wall 204 may be advantageous for producers. However, the embodiment of FIG. 3A is difficult to determine using optical imaging in a wellbore environment. For example, as described above, the scattering material 218 may cause scattering of the beam 216, which reduces the likelihood of obtaining imaging information. However, embodiments of the present disclosure may utilize a time gating approach in order to evaluate image information over a period of time in order to reconstruct a view of the wellbore wall.

FIG. 3B is an example 304 of an embodiment of image data 306 related to the fissure 302 utilizing time gating in order to detect ballistic photons, which may not be subject to scattering. Because the ballistic photons are the first to arrive, due to the absence of scattering, the imager may be time gated in order to isolate and/or substantially evaluate image data related to substantially all ballistic photons. In various embodiments, systems and methods such as streak cameras or Kerr cell gates may be utilized in order to time gate the image data 306 in order to evaluate the ballistic photons. As illustrated, the image data 306 includes a profile 308 that substantially conforms to the fissure 302. However, it should be appreciated that, in various embodiments, minor scattering may also be acquired during the time gate corresponding to the image data 306. Furthermore, in various embodiments, the number of photons that do not undergo scattering may be low, and as a result, multiple different sets of image data may be acquired. For example, the source 212 may emit multiple bursts with corresponding image data being acquired for a period of time after the burst. In highly scattering mediums, the amount of time to obtain the image data may be undesirable. Accordingly, embodiments may further utilize algorithms to utilize the remaining image data to obtain final image data corresponding to the fissure 302.

FIB. 3C is an example 310 of image data 312 corresponding to a time averaged image. For example, the time averaged image includes all or substantially all of the information acquired by the imager 214. For example, in various embodiments, the source 212 may emit bursts of energy (e.g., light) and the imager 214 may obtain the information. The previously described time gated data may correspond to the ballistic photons that underwent no or substantially no scattering, and as a result, arrive first at the imager 214. However, subsequent time gates may be utilized to evaluate photons that have undergone slightly less scattering, and over a time, information may be averaged to further obtain a general outline of the fissure 302. When compared to the image data 306 from FIG. 3B, the image data 312 for FIG. 3C is less refined and/or has more noise, which is a result of the scattering of the photons. In other words, if a photon may be represented as a circle interacting on a flat plane, each subsequent scatting event and time gate will have slightly larger, overlapping circles. Accordingly, compiling the data may lead to an image having a clarity or resolution below an acceptable, predetermined threshold. However, the information may be utilized and processed, for example via an algorithm, to obtain additional image information for evaluation.

FIG. 3D is an example 314 of image data 316 after processing with an algorithm that determines origination of various photons within the pixels of the image data 316. In certain embodiments, the algorithm may utilize cascading probabilities, such as the algorithm described in "All Photons Imaging Through Volumetric Scattering" by Guy Satat et al., Sep. 29, 2016, which is hereby incorporated by reference. The algorithm may evaluate changes over time to estimate scattering. For example, large intensity decreases may be representative of low scattering while gradual intensity decreases may be representative of high scattering. Thereafter, successive frames, which may each be individually time gated, are evaluated to determine a probability of correspondence between successive frames. The algorithm may also predict subsequent frames and later frames to make adjustments to predictions and to the models. Thereafter, a final light pattern may be provided, which may corresponding to the image data 316 of FIG. 3D. It should be appreciated that the algorithm may be part of a machine learning process, such as a trained neural network.

As illustrated, there are differences when comparing the image data of FIG. 3A and FIG. 3D. For example, certain details may not be captured, however, the overall arrangement of the fissure 302 may be illustrated after processing via the algorithm. In certain embodiments, the image data 316 may be evaluated against a confidence threshold prior to the output to determine the likelihood that the image data 316 corresponds to an accurate representation. Advantageously, the optical image may be obtained within the downhole environment and without the challenges associated with attempts to isolate or otherwise separate regions for imaging.

Systems and methods of the present disclosure may also include or in the alternative utilize speckle correlations in order to evaluate image data corresponding to downhole optical imaging through a scattering material. As described above, in various embodiments, speckle correlations utilize the principle that light from nearby points on an object are scatted by the scattering material to produce high correlated, but shifted, random speckle patterns. Accordingly, embodiments of the present disclosure are directed toward autocorrelation and reconstruction of image data to account for the shifted random speckle patterns.

Figure 4D:
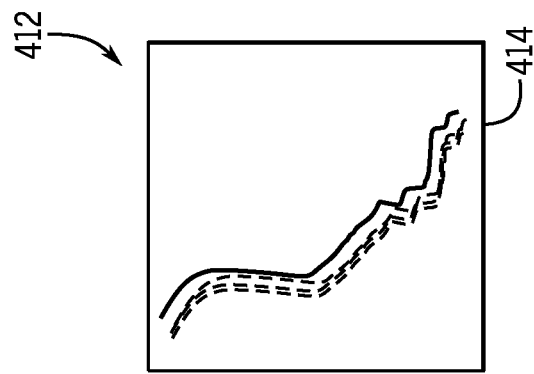
FIGS. 4A-4D are examples of image data for use with downhole optical imaging, in accordance with embodiments of the present disclosure.
Figure 4C:
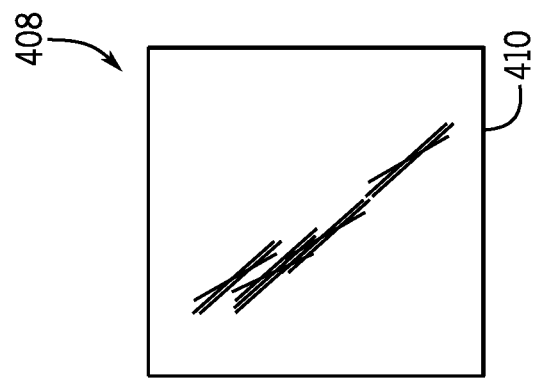
Figure 4B:
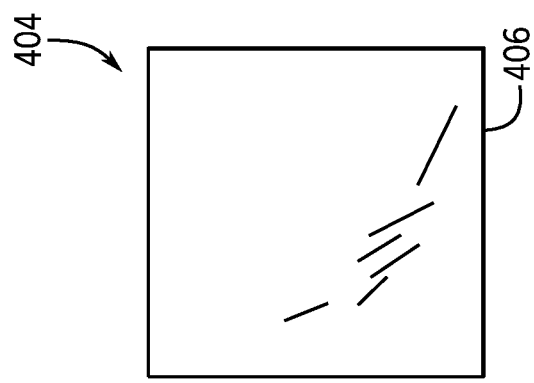
Figure 4A:
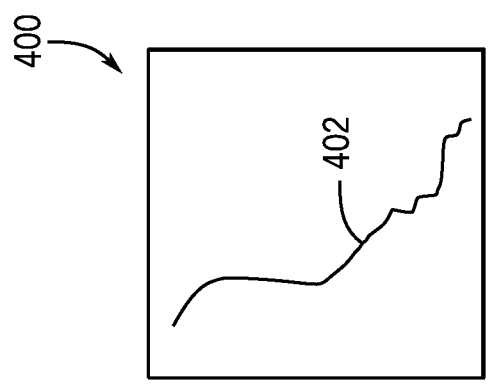

FIGS. 4A-4D are example borehole wall images that may be analyzed using systems and methods of the present disclosure. As described above, in various embodiments the source 212 may emit the beam 216 toward the wellbore wall 204 and image information may be recorded by the imager 214. In the illustrated embodiment, the example 400 of FIG. 4A is representative of a fissure 402 along a wellbore wall 204. However, for the reasons described above, obtaining image data corresponding to the example 400 may be difficult at least due to the scattering material and other properties and challenges associated with optical imaging in a downhole environment. FIG. 4B illustrates an example 404 of image data 406, which may also be referred to as a raw camera image. As illustrated, features of the fissure 402 are not recognizable in the image data 406, and as a result, such an image provides little value for downhole wellbore operations, as the information may not provide direction or guidance for producers regarding wellbore operations. Accordingly, systems and methods of the present disclosure may be used to extract information from the image data 406 indicative of the fissure 402.

FIG. 4C illustrates an example 408 of image data 410 from an autocorrelation process where the image data 406 of FIG. 4B is processed to extract one or more features to determine a source of the energy (e.g., photons). In various embodiments, test data (e.g., ground truth data) may be evaluated to determine autocorrelation information which may then be utilized with autocorrelation data for images associated with the wellbore. As described in "Non-invasive real-time imaging through scattering layers and around corners via speckle correlations" by Katz et al., which is hereby incorporated by reference, the autocorrelation for imaging through the scattering material is essentially identical to the object's autocorrelation. Accordingly, various algorithms such as an iterative Fienup-type algorithm, may be utilized to generate the image data 310 related to the autocorrelation.

FIG. 4D illustrates an example 412 of image data 414 after processing via one or more phrase-retrieval algorithms. Phrase retrieval refers to an algorithmic process of identifying a phase that satisfies a set of constraints for a measured amplitude. In various embodiments, a hybrid input-output algorithm may be utilized. After processing, the image data 414 has a correlation to the fissure 402. As a result, various processing algorithms may be used to extract image information to generate image data, even in the presence of the scattering material.

Figure 5:
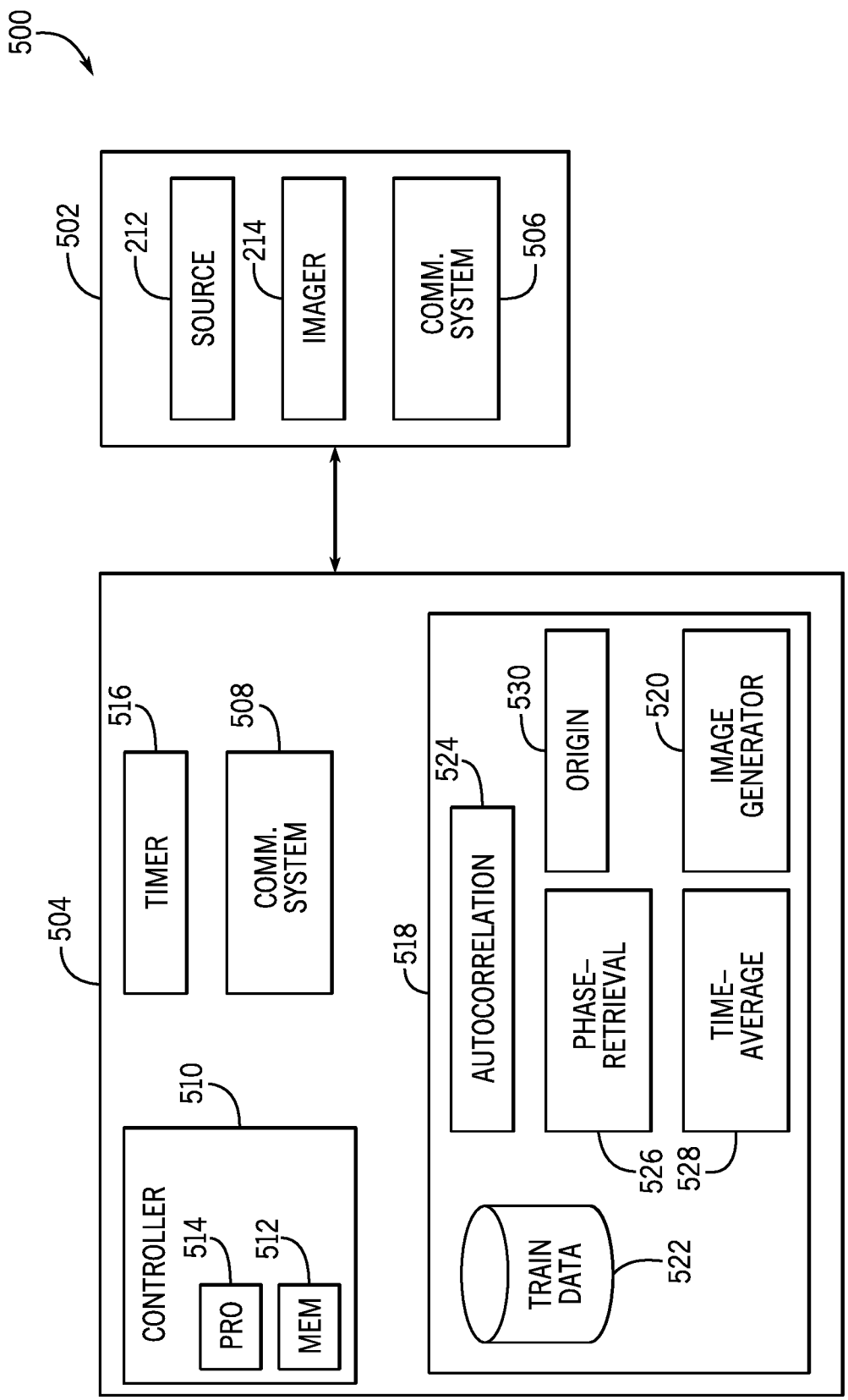
FIG. 5 is a schematic diagram of an environment for use with downhole optical imaging, in accordance with embodiments of the present disclosure.

FIG. 5 is a block diagram of an embodiment environment 500 that may be used with embodiments of the present disclosure. It should be appreciated that while various components may be executed as being separate, in various embodiments different components may be integrated into one. For example, a downhole system 502 and an analysis system 504 are illustrated as separate components, but in embodiments the analysis system 504 may be integrated into the downhole system 502 such that analysis of image data may be performed in real or near real time. The illustrated downhole system includes the source 212 and imager 214. As described above, the source 212 may emit near-infrared light at various times and for different durations to provide illumination to interrogate the wellbore wall. The imager 214 may include a camera, which may be a high speed camera or the like, which may receive and process image data. Further illustrated is a communication system 506, which may provide communication between the downhole system 502 and the analysis system 504, for example via a second communication system 508 of the analysis system 504. In certain embodiments, the respective communication systems 506, 508 may include wired or wireless communication protocols, such as Wi-Fi, Ethernet, serial connections, or the like. For example, communication may include removing a stored memory of the imager 214 and linking it to the analysis system 504. Accordingly, the communication systems 506, 508 facilitate communication of data and instructions between the downhole system 502 and the analysis system 504.

In the illustrated embodiment, the analysis system 504 includes a controller 510 including a memory 512 and a processor 514. The process 514 may execute instructions stored on the memory 512 to facilitate operation of the downhole system 502 and/or the analysis system 504. Moreover, a timer 516 may be utilized for the time gating analysis described above. The timer 516 may be used to, for example, send a signal to the source 212 to interrogate the wellbore wall for a predetermined period of time. Additionally, the timer 516 may determine a period of time when the imager 214 receives the image data, which may be used for the time gated analysis, for example, to determine the ballistic photons. Accordingly, in various embodiments, the analysis system 504 may be used to transmit instructions to the downhole system 502 to obtain image data.

Further illustrated in FIG. 5 is a machine learning system 518 that incorporates an image generator 520 that may be used to generate an image for evaluation after processing. For example, in various embodiments, the machine learning system 518 may incorporate a neural network, such as a convolutional neural network, that may be trained using ground truth data from a training database 522. For example, the training database may include speckle correlation images that may be used with the autocorrelation or phase retrieval steps described above. The illustrated machine learning system 518 also includes an autocorrelation module 524, a phase-retrieval module 526, and a time-average module 528, and an origin module 530. In embodiments, one or more of the modules may be utilized for processing information. For example, with respect to the time-gated analysis, the ballistic photons may be evaluated along with the time-average photons in order to generate an image by determining an origin of the photons, as described above. Furthermore, with respect to the speckle correlation described above, an autocorrelation process may be utilized in combination with the phase retrieval algorithm in order to generate the image data. In this manner, machine learning systems may be incorporated into downhole imaging analysis to enable identification and imaging of various features of the wellbore wall.

Figure 6:
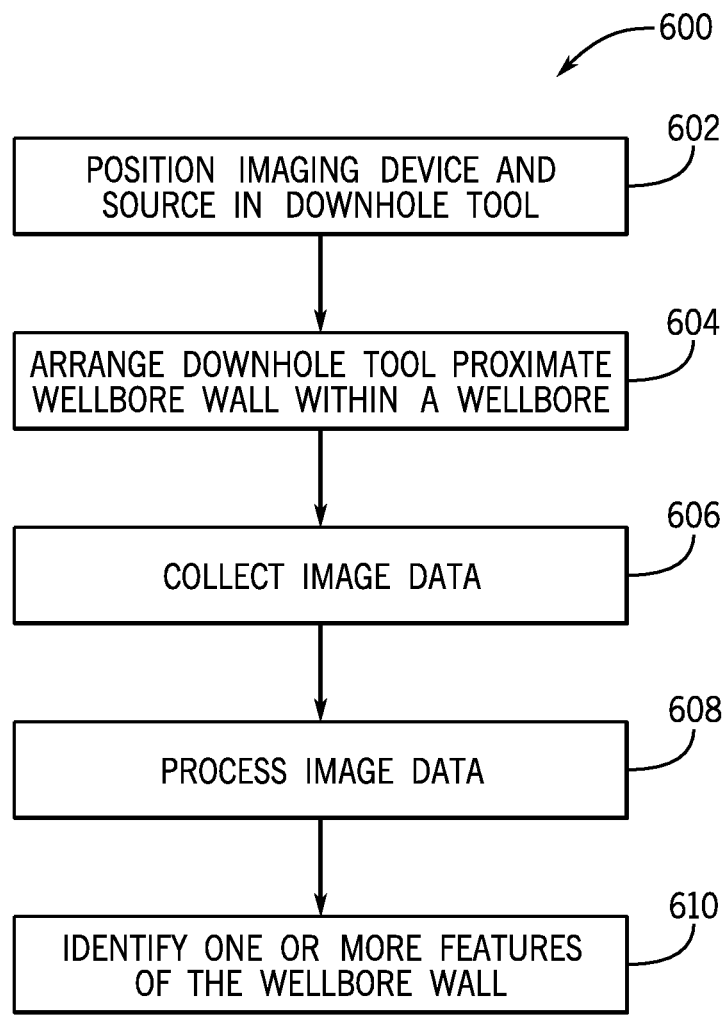
FIG. 6 is a flow chart of an embodiment of a method for downhole optical imaging, in accordance with embodiments of the present disclosure.

FIG. 6 is a flow chart of an embodiment of a method 600 for performing a downhole imaging operation. It should be appreciated that the steps of the method may be performed in any order, or in parallel, unless otherwise specifically stated. Furthermore, in embodiments, there may be more or fewer steps. The method 600 of FIG. 6 begins with positioning an imaging device and a source in a downhole tool 802. For example, as described above, the source may include a light source and the imaging device may include a camera. The downhole tool is lowered into a wellbore and arranged proximate a wellbore wall 804. In various embodiments, the downhole tool may be part of a wireline tool string or a drill string that positions different components at various positions along a wellbore. Image data may be collected 806. For example, the source may illuminate a portion of the wellbore wall, which may be through a scattering material, and imaging data may be collected by the imaging device. In various embodiments, the imaging data may be processed 808. The data may be processed in real or near real time or at a later time. Processing may include utilizing one or more algorithms described above to evaluate the scatting of photons due to the scattering material. The processing steps may generate image data indicative of the wellbore wall, which may be used to identify one or more features of the wellbore wall 810.

It should be appreciated that embodiments call for performing one or more physical operations on the geologic formation using a physical operation apparatus, which may enable collection of the image data. In support of the teachings herein, various analysis components may be used, including a digital and/or an analog system. For example, a downhole sensor, downhole electronics, a downhole tool and/or a surface computer processing system may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection, analysis, and other functions deemed relevant by a system designer, owner, user or other such personnel, in addition to the functions described in this disclosure. Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for downhole optical imaging in a pressurized wellbore at least partially filled with a highly scattering material, comprising:
 a housing forming at least a portion of a tool string;
 a source arranged within the housing, the source emitting light through a window formed in the housing;
 an imager arranged within the housing, the imager receiving imaging data through the window; and
 a control system communicatively coupled to the imager, the control system processing the image data using one or more algorithms, the one or more algorithms modifying the imaging data based at least in part on the highly scattering material surrounding the housing, the highly scattering material including one of suspended solid particles, gas bubbles in a liquid, or liquid-in-liquid emulsions and reducing light intensity by a factor of at least 100,000 per millimeter of pathlength.

2. The system of claim 1, wherein the housing is deployed on a wireline.

3. The system of claim 1, wherein the one or more algorithms include at least one of a time gating operation and a speckle correlation.

4. The system of claim 1, further comprising:
 a machine learning system, the machine learning system being trained to identify one or more autocorrelations between first speckle image data corresponding to image data absent a scattering medium and second speckle image data corresponding to image data in the presence of the scattering medium.

5. The system of claim 1, further comprising:
 a timer, the timer restricting image data capture to a predetermine time period, the predetermined time period corresponding to ballistic photons.

6. The system of claim 1, wherein the housing is positioned within the wellbore and the scattering material is a drilling fluid, particulate matter, or a combination thereof.

7. The system of claim 1, wherein the light emitted by the source is near infrared light.

8. A method for downhole optical imaging, comprising:
 positioning an imaging device and a source within a downhole tool;
 arranging the downhole tool proximate a wellbore wall in an underground formation, the wellbore wall and the downhole tool being covered by a highly scattering material, the highly scattering material including one of suspended solid particles, gas bubbles in a liquid, or liquid-in-liquid emulsions and reducing light intensity by a factor of at least 100,000 per millimeter of pathlength;
 collecting image data, the image data collected through the highly scattering material positioned between the downhole tool and the wellbore wall, the image data reflecting off the wellbore wall; and
 processing the image data, using one or more algorithms, the one or more algorithms adjusting the image data at least in part on the highly scattering material.

9. The method of claim 8, wherein the image data comprises, at least in part, speckle image data.

10. The method of claim 9, wherein processing the image data further comprises:
 determining an autocorrelation between the image data and reference image data; and
 determining a phase of the image data, based at least in part on a phase-retrieval algorithm.

11. The method of claim 8, wherein collecting the image data further comprises:
 collecting first image data over a first period of time, the first image data corresponding to ballistic photons; and
 collecting second image data over a second period of time, the second image data corresponding to scattered photons.

12. The method of claim 11, wherein processing the image data further comprises:
 determining a first image, based at least in part on the first image data;
 determining a second image, based at least in part on the second image data, the second image corresponding to a time averaged composition; and
 determining an origin of the first image data and the second image data.

13. The method of claim 8, wherein the source and the imager are arranged on the same side of the wellbore wall.

14. The method of claim 8, further comprising:
 emitting a near infrared light from the source toward the wellbore wall.

15. The method of claim 8, further comprising:
 determining one or more features of the wellbore wall, based at least in part on processed image data.

16. A system for downhole optical imaging, comprising:
 a housing forming at least a portion of a tool string, the housing arranged within a wellbore, the wellbore including a fluid having suspended particles;
 a source arranged within the housing, the source emitting light through a window formed in the housing;
 an imager arranged within the housing, the imager receiving imaging data through the window, the imager arranged proximate the source; and
 a control system adapted to process the image data using a plurality of algorithms for determining imaging information through a highly scattering material, the highly scattering material reducing light intensity by a factor of at least 100,000 per millimeter of pathlength, the plurality of algorithms including at least speckle correlation, time gating, and phase retrieval, the plurality of algorithms adapted for use with a downhole environment where the imaging information travels through a thickness of the highly scattering material at least two times.

17. The system of claim 16, wherein the housing is deployed on a wireline.

18. The system of claim 16, wherein at least one of the source and the imager is moveable to a position closer to a wellbore wall than the housing.

19. The system of claim 16, wherein the light emitted by the source is near infrared light.

20. The system of claim 16, wherein the plurality of algorithms include a time gating operation and speckle correlation.

* * * * *